J. H. McGEHEE.
Grain Winnower and Separator.
No. 27,919.
Patented April 17, 1860.
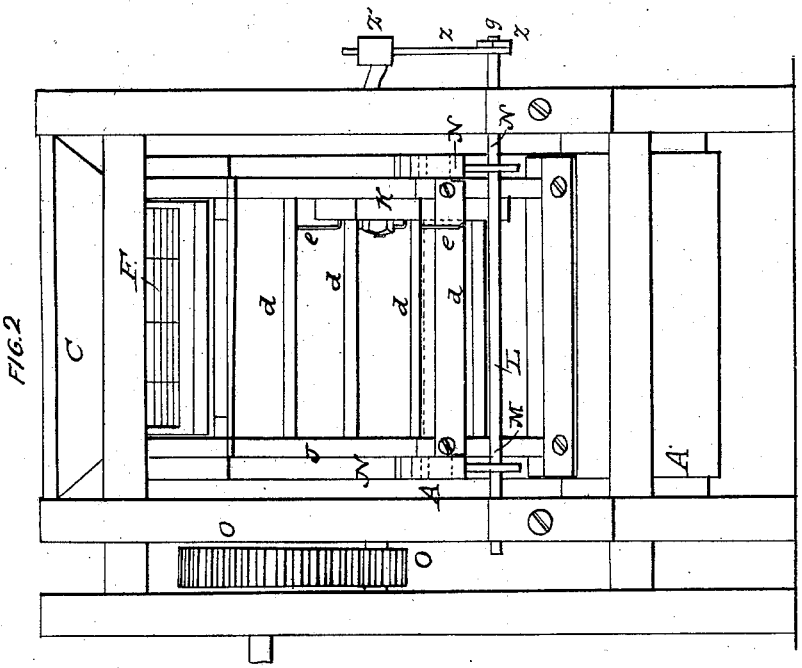
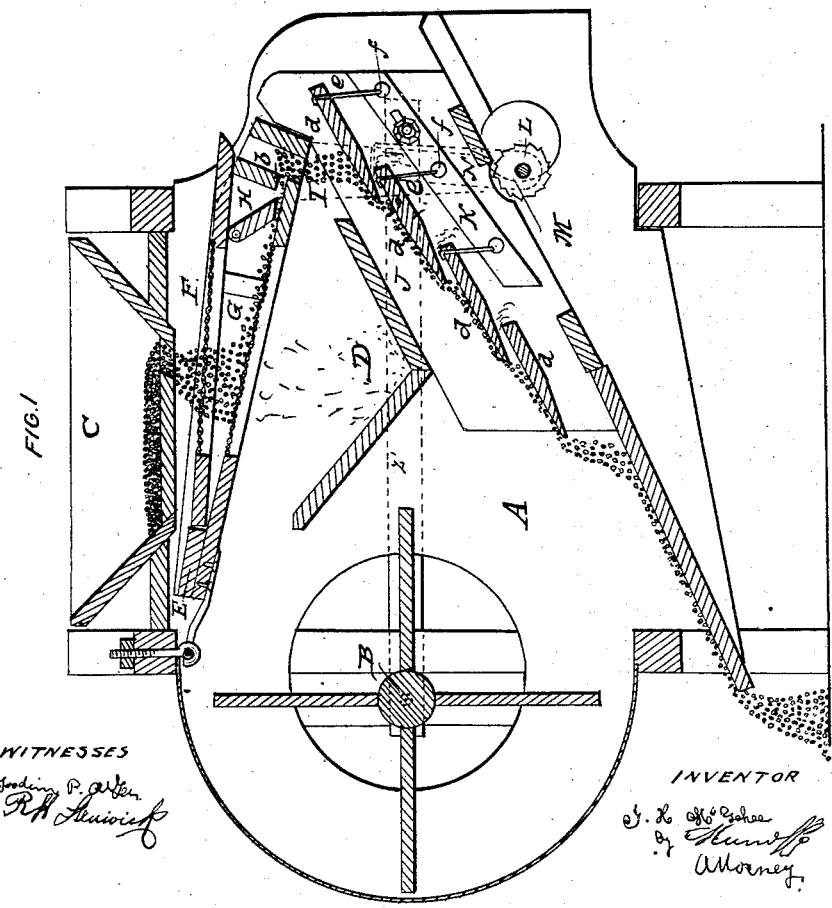

UNITED STATES PATENT OFFICE.

J. H. McGEHEE, OF ATHENS, ALABAMA.

GRAIN-SEPARATOR.

Specification of Letters Patent No. 27,919, dated April 17, 1860.

*To all whom it may concern:*

Be it known that I, J. H. McGehee, of Athens, in the county of Limestone and State of Alabama, have invented a new and useful Improvement in Winnowers and Separators; and I do hereby declare that the following is a full, clear, and exact description of the same, reference being had to the accompanying drawings, forming a part of this specification, in which—

Figure 1, is a vertical longitudinal section of a winnower and separator with my improvement applied to it. Fig. 2, is a front view of the same.

Similar letters of reference, in each of the several figures indicate corresponding parts.

The nature of my invention consists, 1st, in arranging a pivoted self adjusting float or board across the lower end of the second sieve so that the wheat in passing off of said sieve shall be evenly spread before it enters the separating flue, and in case the feed be rapid the escape shall be commensurate therewith.

It consists, 2d, in constructing the slats of the flue of taper form from their front edge to within about one-third of their rear edge and pivoting them nearer their rear edge than their front edge, so that the action of the descending grain on their top surface shall cause their front edge to descend and the action of the blast against their under surface shall cause their front edge to rise, and thus a quivering motion be imparted to them and all danger of the passages between the slats being choked by smut of a specific gravity sufficient to enable it to balance or maintain its position on the slats notwithstanding the action of the blast, is avoided.

To enable others, skilled in the art, to make and use my invention, I will proceed to describe its construction and operation.

A, represents the case, B, the fan and C, the hopper, and D, the chaff or dirt trough of the winnower and separator.

E, is a shoe hinged at the rear of the case, as shown at *a*. This shoe has a coarse sieve F, and a fine sieve G.

H, is a pivoted float or tail-board placed across the lower end of the sieve G; this float rises and falls accordingly as the feed is rapid or slow and thus automatically regulates the escape of the wheat from the sieve G; it also performs the very important function of evenly spreading the grain before it escapes.

I, is a passage at the lower end of the shoe and at right angles to the escape passage *b*, of the sieve G. The wheat and foreign substances fall through this passage and owing to a blast of air from the fan passing up through the passage, a large portion of the cheat and smut are carried off at this stage of the operation.

J, is the inclined flue situated directly in front of the fan. The bottom of this flue is formed of a series of slats *d, d, d, d*, which are set one above the other like steps and have spaces between them for the smut and cheat to be blown through while the grain is passing over them. These slats are beveled on both sides from their front edge, to within about one-third of their back edge, and pivoted at the point where the bevel terminates so that they nearly balance.

K, is a sliding bar with a series of hooks *e, e, e*, attached to it. This bar serves to adjust the slats so that a greater or less space exists between them accordingly as the necessity of the case may require. The hooks *e*, are secured firmly to the rear edge of the slats as shown and hook into enlarged holes or slots *f, f, f*, of the bar. By beveling the slots and pivoting them out of center as described, a greater weight in proportion to the width is imparted to that portion of the slats in rear of the pivots than is imparted to that portion in front of the pivots, but where weight is gained at one point, increased superficial surface is obtained at another and consequently when the grain runs over the slats and wind from the fan passes under them, they are caused to flutter or quiver, the enlarged holes or slots of the bar K, allowing the hooks to play up and down, as this action occurs. By thus agitating the slats, they are caused to throw or loosen up such portions of smut as by their specific gravity remain in suspension opposite the passages between the slats and thus a choking up of said passages perfectly prevented.

L, is a shaft which has the agitating ratchets M, M, arranged fast on it. This shaft is situated at the open end of the case A, and is arranged to be turned at periods in its bearings. The ratchet wheels are situated on the shaft so as to support two vertical legs N, N, of the shoe as shown. To the outer end of the shaft, a crank arm Z is attached by screw *g*, and nut *h*, so that the shaft may be turned independently of the crank arm whenever it is necessary to turn the ratchets a certain distance to bring a new tooth into play. To the crank arm, a pitman Z' leading from the fan shaft attaches, as shown, so that when the fan is revolved by means of the gearing O, O, or otherwise, the ratchets shall be vibrated and the shoe caused to have an up and down shaking motion imparted to it.

What I clam as my invention and desire to secure by Letters Patent, is—

1. Arranging a pivoted self adjusting float or board across the lower end of the second sieve so that the wheat in passing off of said sieve shall be evenly spread before it enters the separating flue and in case the feed be rapid, the escape shall be commensurate therewith, substantially as and for the purposes set forth.

2. Beveling the slats of the flue from their inner edge to within about one-third of their rear edge and hanging them out of center on pivots substantially as and for the purposes set forth.

J. H. McGEHEE.

Witnesses:
 Thomas G. Tyres,
 R. C. David.